(12) United States Patent
Hilliard, Jr.

(10) Patent No.: US 7,343,759 B2
(45) Date of Patent: Mar. 18, 2008

(54) REMOVAL OF VOLATILE VAPORS FROM A STORAGE VESSEL

(75) Inventor: Henry T. Hilliard, Jr., Houston, TX (US)

(73) Assignee: Hilliard Emission Controls, Inc., Houston, TX (US)

( * ) Notice: Subject to any disclaimer, the term of this patent is extended or adjusted under 35 U.S.C. 154(b) by 448 days.

(21) Appl. No.: 11/092,466

(22) Filed: Mar. 29, 2005

(65) Prior Publication Data

US 2006/0218966 A1 Oct. 5, 2006

(51) Int. Cl.
*F25J 3/00* (2006.01)
*F17C 3/10* (2006.01)
*B01D 9/04* (2006.01)

(52) U.S. Cl. ............... 62/617; 62/48.2; 62/540; 62/532

(58) Field of Classification Search .......... 62/617, 62/532, 540, 48.2
See application file for complete search history.

(56) References Cited

U.S. PATENT DOCUMENTS

| | | | | |
|---|---|---|---|---|
| 2,157,579 A | * | 5/1939 | Urquhart | 220/749 |
| 2,524,387 A | * | 10/1950 | Roberts et al. | 101/93.36 |
| 3,003,007 A | * | 10/1961 | Newsome, Jr. | 585/15 |
| 3,385,074 A | * | 5/1968 | Aronson | 62/537 |
| 4,764,272 A | * | 8/1988 | Fox, Sr. | 210/104 |
| 5,377,723 A | | 1/1995 | Hilliard, Jr. | |
| 5,438,843 A | * | 8/1995 | Conlon | 62/124 |
| 5,476,126 A | | 12/1995 | Hilliard, Jr. | |
| 5,779,097 A | * | 7/1998 | Olson et al. | 222/39 |
| 2004/0045440 A1 | * | 3/2004 | Baseen et al. | 95/288 |
| 2004/0148961 A1 | * | 8/2004 | Clodic et al. | 62/532 |
| 2005/0144804 A1 | * | 7/2005 | Alstat | 34/257 |
| 2006/0065014 A1 | * | 3/2006 | McCoy | 62/613 |

* cited by examiner

*Primary Examiner*—William C Doerrler
(74) *Attorney, Agent, or Firm*—Patrick K. Steele; Streets & Steele

(57) ABSTRACT

Volatile vapors are removed from a storage vessel by establishing a flow of a stream of volatile vapors from the storage vessel and directing the stream through a first low temperature condenser for condensing a portion of the stream flowing through the first low temperature condenser. Since a portion of the condensed condensate freezes and causes a pressure drop in the first low temperature condenser, further steps may include directing the stream from the first low temperature condenser through a second low temperature condenser after the pressure drop exceeds a setpoint, stopping the flow of the refrigerant through the first low temperature condenser and using the heat of the volatile vapor stream to melt the frozen condensate in the first low temperature condenser. The stream is switched between the condensers as necessary to prevent excessive plugging due to frozen condensate formation. The system includes the means for implementing the method.

28 Claims, 2 Drawing Sheets

REMOVAL OF VOLATILE VAPORS FROM A STORAGE VESSEL

BACKGROUND OF THE INVENTION

1. Field of the Invention

This invention relates to the field of purging tanks and vessels and more particularly, to methods and apparatus for purging volatile compounds from tanks and vessels in preparation for maintenance and cleaning.

2. Description of the Related Art

Volatile liquids, such as benzene, petroleum and the like, are often stored in tanks at bulk terminals, refineries and end-user facilities, and transported in tanks aboard barges or ships, tank trucks and rail cars. All such containers shall be referred to herein as liquid storage vessels. While resident in these liquid storage vessels, volatilization of the liquid occurs leaving residual vapors which must be removed before workmen can be permitted to enter the vessel and before the vessel can be filled with a different liquid.

In some cases, such residual vapors are purged by flooding liquid storage vessels with a sufficient volume of water or air to entrain the vapors and carry them out of the vessel. The resulting mixture of diluted vapors, in many cases, is simply emitted to the atmosphere and surrounding water supply where they pollute the environment. Emissions handled in this manner lead to severe environmental hazards. For example, hydrocarbons are a major contributor to the formation of smog, which has been proven to increase respiratory disorders among the population.

In addition to these environmental problems, water-flushing facilities must overcome many economic hurdles. Adequate water for such facilities may be expensive due to limited water resources or to restrictions concerning the reuse or recycling of the water. If the water must be reused or recycled, it must be treated to remove contaminants that might pollute the environment or contaminate the next vessel to be flushed.

There have been several patents in the prior art that attempted to address the problem of removing vapors from storage tanks and collecting the gases that are forced out of the storage tank to reuse such gases for combustion or in other vapor-handling units. For example, U.S. Pat. No. 5,476,126 shows apparatus and methods for removing vapors from a storage tank by introducing a purge medium, such as $CO_2$, into the storage vessel and establishing a uniform and continuous stratified interface between the purge medium and the volatile organic compound layer. As the purge medium is continuously fed into the storage tank, the continuous stratified interface moves within the vessel, thereby purging the undiluted volatile vapors from the vessel into the vapor-handling unit where the vapors may, for example, be combusted, adsorbed onto an adsorption bed and/or condensed or cooled to a liquid form by a refrigeration system.

U.S. Pat. No. 1,918,100 shows a gas-gathering system which is basically a closed system in which vapors which collect in a storage tank are pumped into a secondary vapor storage tank partially filled with water and from the vapor storage tank are recaptured through a compression and condensing process to provide dry gas for other uses such as combustion. The patent states as its primary objective the provision of a method and apparatus for maintaining a hydrocarbon gas at all times within the storage tanks above the liquid levels thereof with the specific end in view of preventing air or oxygen from entering the tanks and mixing with the gases contained therein.

Regardless of the progress that has been made in the area of minimizing release of volatile materials into the atmosphere during the preparation of storage vessels for maintenance, there are still areas that need to be improved. It is generally preferred to recover the volatile materials as a liquid, rather than combusting the materials or adsorbing the materials onto an adsorption bed. What is needed are apparatus and methods for recovering the volatile materials that are removed from a storage vessel so that the material may utilized as a product or raw material rather than being disposed of.

SUMMARY OF THE INVENTION

The present invention provides methods and apparatus for removing volatile vapors from a storage vessel. In a preferred embodiment, the method includes the steps of establishing a flow of a stream of volatile vapors from the storage vessel and directing the stream through a first low temperature condenser. A refrigerant flow is started through the first low temperature condenser for condensing a portion of the stream flowing through the first low temperature condenser and freezing a portion of condensate formed in the first low temperature condenser until a pressure drop through the first low temperature condenser exceeds a setpoint. The method further includes directing the stream from the first low temperature condenser through a second low temperature condenser and starting the refrigerant flow through the second low temperature condenser. The frozen condensate in the first low temperature condenser is melted by heat contained in the flow of the stream of volatile vapors and the stream is circulated back to the storage vessel.

In a preferred embodiment of a method for removing volatile vapors from a storage vessel, the steps further include condensing a portion of the stream flowing through the second low temperature condenser and freezing a portion of condensate formed in the second low temperature condenser until a pressure drop through the second low temperature condenser exceeds a setpoint. The stream from the storage tank is directed to the second low temperature condenser for melting the frozen condensate in the second low temperature condenser by heat contained in the flow of the stream of volatile vapors. The method further includes directing the stream from the second low temperature back through the first low temperature condenser and starting the refrigerant flow to the first low temperature condenser.

A preferred embodiment of the method may further include directing the stream through a high temperature condenser just before the steps of directing the stream through the low temperature condensers and condensing and draining a portion of the stream flowing through the high temperature condenser. The refrigerant flow through the second low temperature condenser may be stopped to allow the frozen condensate in the second low temperature condenser to melt. Preferably, the refrigerant is removed from the low temperature condensers after the step of stopping the refrigerant flow through the low temperature condensers.

In a preferred embodiment, the step of establishing a flow of a stream of volatile vapors ay further include pumping the stream from the storage vessel, wherein the stream is heated by a heat of compression of the stream of volatile vapors. The method may further include draining condensate from the condensers and collecting the drained condensate.

The high temperature condenser may cool the stream to less than about 40° F., preferably between about 33° F. and about 35° F. The low temperature condensers may cool the stream to less than about −50° F. or preferably, to less than about −130° F. The temperature ranges necessary to cool the stream are dependent upon the volatile vapors to be condensed, their concentration and whether there is water present.

A preferred embodiment of the method of the present invention may include automatically monitoring the pressure drop across the first low temperature condenser and automatically executing the step of directing the stream from the first low temperature condenser through a second low temperature condenser when the pressure drop approximately equals the setpoint.

The present invention further provides a system for removing volatile vapors from a storage tank. In a preferred embodiment, the system includes means for establishing a flow of a stream of volatile vapors from the storage vessel and means for directing the stream through a first low temperature condenser. Means for starting a refrigerant flow through the first low temperature condenser and means for condensing a portion of the stream flowing through the first low temperature condenser and freezing a portion of condensate formed in the first low temperature condenser until a pressure drop through the first low temperature condenser exceeds a setpoint. The system further includes means for directing the stream from the first low temperature condenser through a second low temperature condenser and means for starting the refrigerant flow through the second low temperature condenser. The frozen condensate in the first low temperature condenser is melted by heat contained in the flow of the stream of volatile vapors and the stream is circulated back to the storage vessel.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION OF PREFERRED EMBODIMENTS

Figure 1:
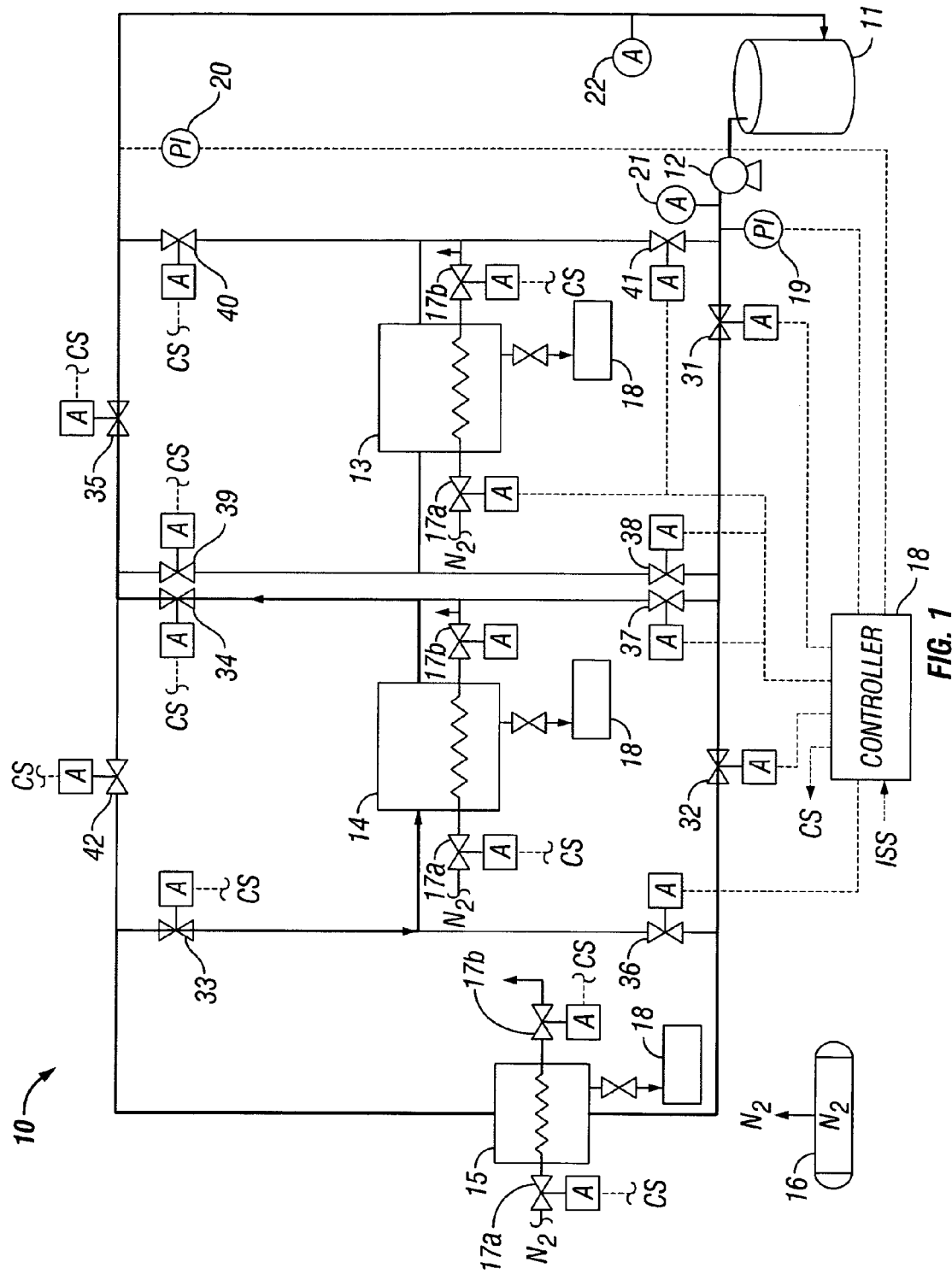
FIG. 1 is a schematic of a system for removing volatile vapors from a storage vessel.

The present invention provides methods for removing volatile vapors from a storage vessel and apparatus for implementing the methods. One of the advantages of the method of the present invention is that the volatile vapors removed from the storage vessel are not combusted or otherwise disposed of but rather are converted into a liquid state that may be sold as a product or utilized as a raw material for a process.

Storage vessels are used for storing many volatile products such as gasoline, gasoline blending components, diesel, kerosene, solvents, petrochemicals, organic compounds and inorganic compounds. Before entry into the vessels by personnel assigned to perform maintenance on the empty storage vessel, the vessel must be purged of the harmful volatile vapors that were generated while the storage vessel was in use.

In a preferred embodiment of the method of the present invention, a blower takes suction from the storage vessel and circulates a stream of volatile vapors from the storage vessel, through a series of condensers, and then returns the uncondensed vapors back to the storage vessel for further circulation through the system. As the stream circulates through the condensers, some of the volatile vapors are condensed and drained from the condensers for recovery as a useful product. The circulation process through the series of condensers is continued until the vapor space is suitably free of harmful volatile vapors. As the vapors are condensed, the volume of gas within the storage vessel may be replaced with air or may be replaced with another gas such as, for example, nitrogen, carbon dioxide or other gas suitable for a given application.

While one or more blowers is a preferred apparatus for establishing the flow of the stream of volatile vapors for circulation through the series of condensers, other apparatus are also suitable, either alone or in combination with a blower such as, for example, rotary compressors, fans, reciprocating compressors, centrifugal compressors, other vapor pumps known to those having ordinary skill in the art and combinations thereof. The blowers may be driven by electric motors, pneumatic motors, turbines or other drivers known to those having ordinary skill in the art.

The stream of volatile vapors is circulated through the vapor removal system through suitable conduits that connect the storage vessel, the vapor pump and the series of condensers. Preferably, metal piping is used such as, for example, carbon steel piping. Alternatively, plastic piping may be useful as well as flexible hose or hose made of woven metal. Material selection for the conduits may be properly selected by one having ordinary skill in the art for each given application.

The volatile vapor stream pumped from the storage vessel is first cooled in a high temperature condenser. The condenser cools the vapor to a temperature below about 40° F. and preferably below about 35° F. In a preferred embodiment, the high temperature condenser cools the volatile vapor stream to a temperature between about 30° F. and about 35° F., more preferably to about 33° F.

The high temperature condenser may be a shell and tube condenser, a plate condenser or other suitable condenser as known to those having ordinary skill in the art. Typically, only one shell is required but two or more shells may be useful. As the volatile vapor stream passes through one side of the high temperature condenser, a refrigerant passes through the other side to cool the volatile vapor stream and condense some of the volatile vapors. Useful refrigerants include, but are not limited to, FREON, propane, liquid nitrogen and ammonia. Alternatively, or in combination with the above, a refrigerant may be used to cool a circulating coolant stream. The circulating coolant stream circulates through the condensers to cool and condense the volatile vapor stream and then circulates through another set of exchangers to be cooled by the refrigerant. Any suitable material may be used for the circulating cooling stream but a preferred material is brine. Refrigerant systems and condensers are well known in the art and neither, therefore, is described herein in detail.

As the high temperature condenser cools the volatile vapor stream, most of the water contained in the stream, if any, condenses out at this stage. Additionally, some of the volatile vapors may also condense at this temperature. The condensate formed in the high temperature condenser accumulates at the bottom of the condenser for draining. The condensate may be drained manually into a condensate collection system or the condensate may be drained automatically using a controller that monitors a liquid level in the condenser or monitors another physical property such as temperature or conductivity to sense a liquid level. When the controller senses a liquid level via a level sensing device, such as a float or a pressure differential sensor for measuring liquid head, thermocouple or thermometer for measuring temperature, in electrical communication with the controller, the controller may send a signal to a control valve to open and allow the condensate to drain from the condenser.

The volatile vapor stream circulates from the high temperature condenser to a first low temperature condenser. The low temperature condenser may be of shell and tube design, of plate design or of other design as known to those having ordinary skill in the art. Typically, only one shell is required but two or more shells may be useful. As the volatile vapor stream passes through one side of the first low temperature condenser, a refrigerant passes through the other side to cool the volatile vapor stream and condense some of the volatile vapors.

The low temperature condenser is operated at a much lower temperature than the high temperature condenser to allow removal of most of the volatile vapors by condensation. The low temperature condensers cool the volatile vapors to less than about −50° F., and preferably to less than about −90° F. While temperature ranges are suggested herein for both the high and low temperature condensers, it should be noted that temperatures outside the disclosed typical ranges may be suitable for certain applications and such disclosed typical temperature ranges are not meant to limit the present invention. Similarly as to the high temperature condenser, the condensate formed in the low temperature condensers accumulates in the bottom of the condenser and may be drained either automatically or manually.

As the volatile vapors and remaining water vapors condense in the low temperature condensers, some of the condensate does not accumulate in the bottom of the condenser but instead freezes and plugs a portion of the condenser. As the condenser begins to plug, additional pressure drop is added to the system, reducing the circulation rate of the volatile vapor stream. As more condensate freezes, the frozen condensate plugs a greater volume of the condenser until all circulation is stopped and the system is shut down.

To prevent shutting down the system due to the frozen condensate, a preferred embodiment of the present invention provides a second low temperature condenser through which the volatile vapor stream may be selectively directed to continue the circulation and condensation. With the circulation proceeding through the second low temperature condenser, the first low temperature condenser may be thawed out and the thawed condensate drained and collected. Then, the first low temperature condenser may be placed on standby for use when the second low temperature condenser experiences a high pressure drop due to frozen condensate.

To thaw the low temperature condensers when they are plugged due to frozen condensate, the volatile vapor stream is directed from the discharge of the vapor pump to the partially plugged low temperature condenser. Since the volatile vapor stream is heated by its heat of compression as the vapor is pumped by the vapor pump, the hot vapor stream can melt the frozen condensate as it is pumped through the condenser. As the frozen condensate thaws, it falls to the bottom of the condenser for draining and recovery. The volatile vapor stream is cooled as it melts the condensate and is then circulated to the high temperature condenser as disclosed above. Some of the frozen condensate may vaporize into the heated volatile vapor stream and will be condensed as the stream is directed through the in-service condenser.

To determine when to switch from one low temperature condenser to the other, the pressure drop across each of the low temperature condensers, or across the entire system or a portion thereof that includes the condensers, is monitored. The monitoring equipment may include pressure transmitters, differential pressure transmitters, pressure gauges or combinations thereof. When the pressure drop increases to a predetermined setpoint that indicates one of the low temperature condensers is becoming plugged due to frozen condensate, the circulation of the volatile vapor stream may be switched from the partially plugged low temperature condenser to the standby low temperature condenser. The switching from one condenser to the other may be made manually or may be accomplished with a controller that monitors the pressure drop and sends a signal to a set of control valves to switch the flow when the pressure drop is at or near the setpoint limit. Any of the controllers mentioned herein may be digital controllers, analogue controllers or combinations thereof and may be individual controllers suitable for controlling one process condition or one controller, such as a computer or microprocessor controller capable of controlling and monitoring multiple process conditions, or combinations thereof.

One advantage of the present invention is that any failure of a component does not result in the release of harmful vapors to the atmosphere. For example, if the condensers fail to condense the volatile vapors from the volatile vapor stream due, for example, to operator inattention resulting in allowing the condenser temperature to become too high, from mechanical failure of a valve or the blower, running out of refrigerant such as liquid nitrogen or carbon dioxide, the vapors stay in the condenser loop and are not vented to the atmosphere as may occur in a system that utilizes combustion or adsorption of the volatile vapors.

To maximize the rate of condensate melting in the low temperature condenser when the circulating vapors from the vapor pump are directed to the plugged low temperature condenser, the refrigerant flow to the condenser should be stopped and preferably drained. Preferably, the refrigerant flow should be stopped and the refrigerant drained close to the time that the condenser is removed from cooling service.

It should be noted that if the volatile vapors do not contain water, a first high temperature condenser may not be required since a primary purpose of the high temperature condenser is to remove water from the circulating volatile vapor stream.

Optionally, the system may include an economizer exchanger for transferring heat between the volatile vapor stream flowing to the condensers and the volatile vapor return stream flowing back to the storage vessel. The economizer may be an exchanger of the types disclosed for the condensers. The economizer cools the volatile vapor stream and heats the return stream to reduce the load on the refrigerant system. The economizer is located downstream of the high temperature condenser being heated to melt the condensate but upstream of any condenser that is in-service for cooling the volatile vapor stream. Valves as described above may be used for directing the flow of the volatile vapor streams through the economizer, either manually or by a controller that automatically positions the valves.

FIG. 1 is a schematic of a system for removing volatile vapors from a storage vessel. The system 10 shown in FIG. 1 is one preferred embodiment of the present invention useful for removing volatile vapors from a storage vessel 11. Suction is taken from the storage vessel 11 by a blower 12 that circulates the volatile vapors from the storage vessel 11 to the high temperature condenser 15 for cooling to about 33° F. Preferably, flame arrestors (not shown) may be included on both the suction and discharge of the blower 12 to protect the storage vessel 11 from flashback. Liquid nitrogen is supplied from a storage vessel 16, such as a cryogenic tank, as the refrigerant to the high temperature condenser 15 and the low temperature condensers 13, 14. The flow of the refrigerant may be manually controlled with valves, or the valves may be replaced with control valves 17a, 17b with actuators that are controlled by a controller 18 that senses the outlet temperatures of the condensers 13, 14, 15 and adjusts the refrigerant flow to maintain a setpoint temperature at the outlet of each condenser 13, 14, 15. The controller 18 adjusts the control valves 17a, 17b by sending a control signal (cs) to the actuators (A) on the valves 17a, 17b. The refrigerant inlet valve 17b is typically wide open when a condenser is on-line and the refrigerant outlet valve 17b is adjusted to control the outlet temperature from the condensers 13, 14, 15. The refrigerant inlet valve 17a is typically closed when the condenser 13, 14, 15 is offline. The controller 18 is preferably a computer, such as a personal computer, but may be of any type controller known to those having ordinary skill in the art including, for example, analogue controllers, digital controllers, distributed control or combinations thereof The nitrogen gas vented from the condensers 13, 14, 15 is typically vented to the atmosphere but some of the gas may be directed into the circulating volatile vapor stream to replace the condensed volatile vapors and thereby prevent a vacuum from being created within the storage vessel 11. The nitrogen gas may be directed into the circulating volatile vapor stream through a valve that is adjusted either manually or with the controller 18.

All of the valves used in the system are preferably wafer valves but all or some of the valves may be of other types of valves suitable for a given application such as, for example, ball valves, gate valves, globe valves, slide valves, 3-way valves, others known to those having ordinary skill in the art or combinations thereof. Any materials for the valves are useful as long as the materials are suitable for the particular service as known to those having ordinary skill in the art. Actuators on the valves may be powered by electric motors, hydraulics, pneumatics, solenoids, springs, other sources known to those having ordinary skill in the art or combinations thereof.

As the volatile vapor stream circulates through the condensers 13, 14, 15, condensate forms in the bottom of the condensers 13, 14, 15 and may be drained and recovered into condensate vessels 18. Alternatively, the condensate may be drained into just one condensate vessel (not shown) from one or more of the condensers 13, 14, 15.

After circulating through the high temperature condenser 15, the volatile vapor stream flows through the first low temperature condenser 14 where the stream is cooled to about −100° F. Condensate produced in the first low temperature condenser 14 is drained and recovered into the condensate vessel 18. The stream then circulates back to the storage vessel 11.

To circulate the volatile vapor stream through the high temperature condenser 15 and the first low temperature condenser 14, a first set of circulation valves 31, 32, 33, 34, 35 are open and all other circulation valves 36, 37, 38, 39 40, 41, 42 remain closed. As noted above, the valves may be positioned manually but preferably, the valves are positioned by the controller 18 sending control signals to actuators on each of the valves 31-42.

The pressure difference between the pressure measured by high side pressure indicator 19 and the pressure measured by the low side pressure indicator 20 provide the differential pressure across the system. The indicators 19, 20 may be local indicators, such as a pressure gauge, or they may be pressure transmitters that send a signal to the controller 18 so that the controller can monitor the system pressure drop. Alternatively, the pressure drop may be measured by a differential pressure measuring device, such as a differential pressure transmitter. When the controller 18 senses that the pressure drop has climbed to a predetermined setpoint indicating that the low temperature condenser is plugging off due to frozen condensate, the controller 18 may activate valves to switch the flow of the volatile vapor stream from the first low temperature condenser 14 to the second high temperature condenser 13. At about the same time, or just prior to the switch, the controller 18 may stop the flow of refrigerant to the first low temperature condenser 14 by shutting the refrigerant flow valve 17a controlling the flow of refrigerant to the first low temperature condenser 14. The refrigerant outlet valve 17b remains open until all the refrigerant has evaporated from the condenser 14.

Figure 2:
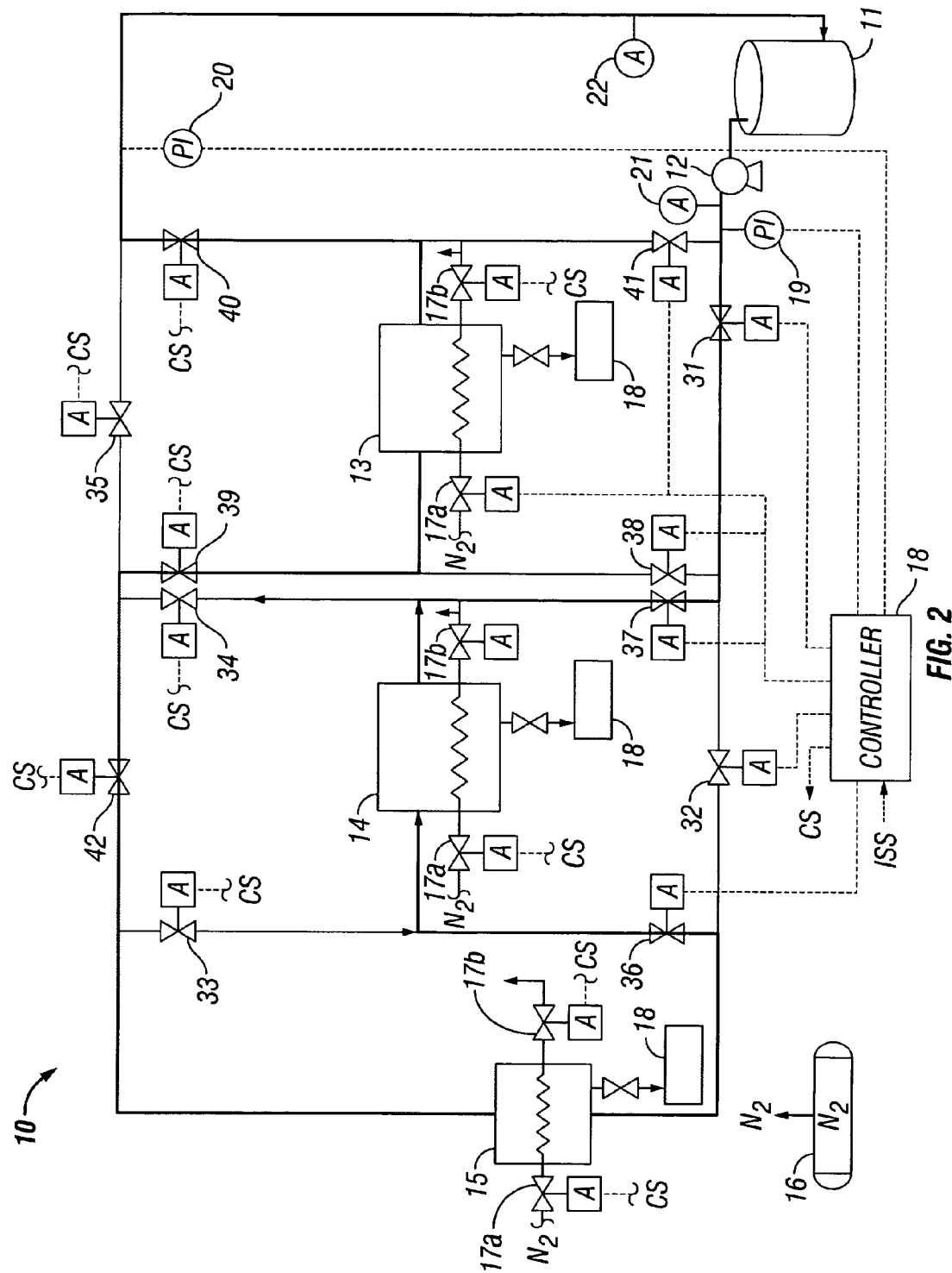
FIG. 2 is a schematic of the system shown in FIG. 1 showing the volatile vapor flow from the tank heating the first low temperature condenser.

FIG. 2 is a schematic of the system shown in FIG. 1 showing the volatile vapor flow from the tank heating the first low temperature condenser. To switch the flow of the volatile vapor stream from the first low temperature condenser to the second high temperature condenser and to direct the hot volatile vapor stream from the discharge of the blower 12 to the first low temperature condenser 14, the controller 18 activates the circulation valves to cause a second set of circulation valves 31, 37, 36, 42, 39, 40 to be open and all other circulation valves 32, 33, 34, 35, 38, 41 to be closed. The flow of the volatile vapor stream from the blower 12 to the first low temperature condenser 14 causes the frozen condensate to thaw and drop to the bottom of the condenser 14 for draining and recovery.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. For example, the phrase "a solution comprising a phosphorus-containing compound" should be read to describe a solution having one or more phosphorus-containing compound. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention.

It should be understood from the foregoing description that various modifications and changes may be made in the preferred embodiments of the present invention without departing from its true spirit. The foregoing description is provided for the purpose of illustration only and should not be construed in a limiting sense. Only the language of the following claims should limit the scope of this invention.

What is claimed is:

1. A method for removing volatile vapors from a storage vessel, comprising:

establishing a flow of a stream of volatile vapors from the storage vessel;
directing the stream through a vapors side of a first low temperature condenser having an inlet and an outlet;
starting a refrigerant flow through a refrigerant side of the first low temperature condenser;
condensing a portion of the stream flowing through the vapors side of the first low temperature condenser;
freezing a portion of condensate formed in the vapors side of the first low temperature condenser until a pressure drop through the vapors side of the first low temperature condenser exceeds a setpoint;
directing the stream from the outlet of the vapors side of the first low temperature condenser through a vapors side of a second low temperature condenser having an inlet and an outlet;
reducing the refrigerant flow through the refrigerant side of the first low temperature condenser and starting the refrigerant flow through a refrigerant side of the second low temperature condenser;
melting the frozen condensate in the vapors side of the first low temperature condenser by heat contained in the flow of the stream of volatile vapors; and
circulating the stream back to the storage vessel.

2. The method of claim 1, further comprising:
condensing a portion of the stream flowing through the vapors side of the second low temperature condenser;
freezing a portion of condensate formed in the vapors side of the second low temperature condenser until a pressure drop through the vapors side of the second low temperature condenser exceeds a setpoint;
directing the stream from the storage tank to the vapors side of the second low temperature condenser;
melting the frozen condensate in the vapors side of the second low temperature condenser by heat contained in the flow of the stream of volatile vapors from the storage tank;
directing the stream from the vapors side of the second low temperature back through the vapors side of the first low temperature condenser; and
starting the refrigerant flow to the vapors side of the first low temperature condenser.

3. The method of claim 2, further comprising:
directing the stream through a vapors side of a high temperature condenser just before the steps of directing the stream through the vapors side of the first low temperature condenser or the vapors side of the second low temperature condenser; and
condensing and draining a portion of the stream flowing through the vapors side of the high temperature condenser.

4. The method of claim 2, further comprising:
stopping the refrigerant flow through the refrigerant side of the second low temperature condenser to allow the frozen condensate in the vapors side of the second low temperature condenser to melt.

5. The method of claim 4, further comprising:
removing the refrigerant from the refrigerant side of the second low temperature condenser after the step of stopping the refrigerant flow through the refrigerant side of the second low temperature condenser.

6. The method of claim 1, further comprising:
stopping the refrigerant flow through the refrigerant side of the first low temperature condenser to allow the frozen condensate in the vapors side of the first low temperature condenser to melt.

7. The method of claim 6, further comprising:
removing the refrigerant from the refrigerant side of the first low temperature condenser after the step of stopping the refrigerant flow through the refrigerant side of the first low temperature condenser.

8. The method of claim 1, wherein the step of establishing a flow of a stream of volatile vapors further comprises:
pumping the stream from the storage vessel and to a condenser, wherein the stream is heated by a heat of compression of the stream of volatile vapors.

9. The method of claim 1, further comprising:
draining condensate from the first low temperature condenser or the second low temperature condenser; and
collecting the drained condensate.

10. The method of claim 3, wherein the high temperature condenser cools the stream from the storage vessel to less than about 40° F.

11. The method of claim 3, wherein the high temperature condenser cools the stream from the storage vessel to between about 33° F. and about 35° F.

12. The method of claim 1, wherein the low temperature condensers cool the stream from the storage vessel to less than about −50° F.

13. The method of claim 1, wherein the low temperature condensers cool the stream from the storage vessel to less than about −130° F.

14. The method of claim 1, further comprising:
automatically monitoring the pressure drop across the vapors side of the first low temperature condenser; and
automatically executing the step of directing the stream from the outlet of the vapors side of the first low temperature condenser through the vapors side of the second low temperature condenser when the pressure drop approximately equals the setpoint.

15. A system for removing volatile vapors from a storage vessel, comprising:
means for establishing a flow of a stream of volatile vapors from the storage vessel;
means for directing the stream through a vapors side of a first low temperature condenser;
means for starting a refrigerant flow through a refrigerant side of the first low temperature condenser;
means for condensing a portion of the stream flowing through the vapors side of the first low temperature condenser;
means for freezing a portion of condensate formed in the vapors side of the first low temperature condenser until a pressure drop through the vapors side of the first low temperature condenser exceeds a setpoint;
means for directing the stream from the vapors side of the first low temperature condenser through a vapors side of a second low temperature condenser;
means for starting the refrigerant flow through the vapors side of the second low temperature condenser;
means for melting the frozen condensate in the vapors side of the first low temperature condenser by heat contained in the flow of the stream of volatile vapors; and
means for circulating the stream back to the storage vessel.

16. The system of claim 15, further comprising:
means for condensing a portion of the stream flowing through the vapors side of the second low temperature condenser;
means for freezing a portion of condensate formed in the vapors side of the second low temperature condenser until a pressure drop through the vapors side of the second low temperature condenser exceeds a setpoint;

means for directing the stream from the storage tank to the vapors side of the second low temperature condenser;

means for melting the frozen condensate in the vapors side of the second low temperature condenser by heat contained in the flow of the stream of volatile vapors;

means for directing the stream from the vapors side of the second low temperature condenser back through the vapors side of the first low temperature condenser; and means for re-starting the refrigerant flow to the refrigerant side of the first low temperature condenser.

17. The system of claim 16, further comprising:

means for directing the stream through a high temperature condenser just before the step of directing the stream through the vapors sides of the first low temperature condenser and the vapors side of the second low temperature condenser; and means for condensing and draining a portion of the stream flowing through the high temperature condenser.

18. The system of claim 16, further comprising:

means for stopping the refrigerant flow through the refrigerant side of the second low temperature condenser to allow the frozen condensate in the vapors side of the second low temperature condenser to melt.

19. The system of claim 16, further comprising:

means for removing the refrigerant from the refrigerant side of the second low temperature condenser after the step of stopping the refrigerant flow through the refrigerant side of the second low temperature condenser.

20. The system of claim 15, further comprising:

means for stopping the refrigerant flow through the refrigerant side of the first low temperature condenser to allow the frozen condensate in the vapors side of the first low temperature condenser to melt.

21. The system of claim 20, further comprising:

means for removing the refrigerant from the refrigerant side of the first low temperature condenser after the step of stopping the refrigerant flow through the refrigerant side of the first low temperature condenser.

22. The system of claim 15, wherein the step of establishing a flow of a stream of volatile vapors further comprises:

means for pumping the stream from the storage vessel and to a condenser, wherein the stream is heated by a heat of compression of the stream of volatile vapors.

23. The system of claim 15, further comprising:

means for draining condensate from the vapors side of the first low temperature condenser and from the vapors side of the second low temperature condenser; and means for collecting the drained condensate.

24. The system of claim 17, wherein the high temperature condenser cools the stream from the storage vessel to less than about 40° F.

25. The system of claim 17, wherein the high temperature condenser cools the stream from the storage vessel to between about 33° F. and about 35° F.

26. The system of claim 15, wherein the low temperature condensers cool the stream from the storage vessel to less than about −50° F.

27. The system of claim 15, wherein the low temperature condensers cool the stream from the storage vessel to less than about −130° F.

28. The system of claim 15, further comprising:

means for automatically monitoring the pressure drop across the vapors side of the first low temperature condenser; and means for automatically executing the step of directing the stream from the vapors side of the first low temperature condenser through the vapors side of the second low temperature condenser when the pressure drop approximately equals the setpoint.

* * * * *